(12) United States Patent
Varekamp et al.

(10) Patent No.: US 12,147,730 B2
(45) Date of Patent: *Nov. 19, 2024

(54) AUDIO APPARATUS, AUDIO DISTRIBUTION SYSTEM AND METHOD OF OPERATION THEREFOR

(71) Applicant: KONINKLIJKE PHILIPS N.V., Eindhoven (NL)

(72) Inventors: Christiaan Varekamp, Veldhoven (NL); Jeroen Gerardus Henricus Koppens, Nederweert (NL); Bart Kroon, Eindhoven (NL); Nathan Souviraa-Labastie, Mons-en-Baroeul (FR); Arnoldus Werner Johannes Oomen, Eindhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 0 days.

This patent is subject to a terminal disclaimer.

(21) Appl. No.: 18/136,902

(22) Filed: Apr. 20, 2023

(65) Prior Publication Data

US 2023/0251819 A1  Aug. 10, 2023

Related U.S. Application Data

(63) Continuation of application No. 17/258,822, filed as application No. PCT/EP2019/067648 on Jul. 2, 2019, now Pat. No. 11,656,839.

(30) Foreign Application Priority Data

Jul. 9, 2018 (EP) ..................... 18182366

(51) Int. Cl.
*G06F 3/16* (2006.01)
*H04L 12/18* (2006.01)
*H04S 7/00* (2006.01)

(52) U.S. Cl.
CPC .......... *G06F 3/165* (2013.01); *H04L 12/1827* (2013.01); *H04S 7/304* (2013.01);
(Continued)

(58) Field of Classification Search
CPC ..... G06F 3/165; H04L 12/1827; H04S 7/304; H04S 2400/11; H04S 2400/15; H04S 2420/01
See application file for complete search history.

(56) References Cited

U.S. PATENT DOCUMENTS 7,379,962 B1    5/2008  Matsuoka
2008/0144794 A1  6/2008  Gardner
(Continued)

FOREIGN PATENT DOCUMENTS

JP    2009115735 A    5/2009

OTHER PUBLICATIONS

Devis Thomas et al Automated Suppression of Howling Noise Using Sinusoidal Model Based Analysis/Synthesis, ITM University, pp. 761-765 (2014).

(Continued)

*Primary Examiner* — Joseph Saunders, Jr.

(57) ABSTRACT

A distribution system comprises an audio server (101) for receiving incoming audio from remote clients (103) and for transmitting audio derived from the incoming audio to the remote clients (103). An audio apparatus comprises an audio a receiver (401) which receives data comprising: audio data for a plurality of audio components representing audio from a remote client of the plurality of remote clients; and proximity data for at least one of the audio components. The proximity data is indicative of proximity between remote clients. A generator (403) of the apparatus generates an audio mix from the audio components in response to the proximity data. For example, an audio component indicated (Continued)

to be proximal to a remote client may be excluded from an audio mix for that remote client.

18 Claims, 6 Drawing Sheets

(52) U.S. Cl.
CPC ....... *H04S 2400/11* (2013.01); *H04S 2400/15* (2013.01); *H04S 2420/01* (2013.01)

(56) References Cited

U.S. PATENT DOCUMENTS

| | | |
|---|---|---|
| 2008/0159507 A1 | 7/2008 | Virolainen |
| 2009/0097360 A1 | 4/2009 | Jeong et al. |
| 2012/0121076 A1 | 5/2012 | Yoakum |
| 2015/0382127 A1 | 12/2015 | Sun |
| 2016/0189726 A1 | 6/2016 | Raniwala |
| 2017/0205986 A1 | 7/2017 | Sun |
| 2017/0353811 A1 | 12/2017 | McGibney |
| 2018/0088900 A1 | 3/2018 | Glaser |
| 2018/0157321 A1 | 6/2018 | Liu |

OTHER PUBLICATIONS

International Organisation for Standardisation Organisation Internationale De Normalisation ISO/IEC JTC 1/SC 29/WG 11 Coding of Moving Pictures and Audio ISO/IEC JTC1/SC29/WG11 N17537Apr. 2018—San Diego, CA, US.
International Search Report and Written Opinion From PCT/EP2019/067648 Mailed Oct. 1, 2019.

AUDIO APPARATUS, AUDIO DISTRIBUTION SYSTEM AND METHOD OF OPERATION THEREFOR

CROSS-REFERENCE TO PRIOR APPLICATIONS

This application is a continuation of U.S. patent application Ser. No. 17/258,822 filed on Jan. 8, 2021 which is the U.S. National Phase application under 35 U.S.C. § 371 of International Application No. PCT/EP2019/067648, filed on Jul. 2, 2019, which claims the benefit of EP Patent Application No. EP 18182366.7 filed on Jul. 9, 2018. These applications are hereby incorporated by reference herein.

FIELD OF THE INVENTION

The invention relates to an audio apparatus, audio distribution system and method therefor, and in particular, but not exclusively, to using such to support an Augmented/Virtual Reality conference application.

BACKGROUND OF THE INVENTION

The variety and range of experiences based on audiovisual content have increased substantially in recent years with new services and ways of utilizing and consuming such content continuously being developed and introduced. In particular, many spatial and interactive services, applications and experiences are being developed to give users a more involved and immersive experience.

Examples of such applications are Virtual Reality (VR) and Augmented Reality (AR) applications which are rapidly becoming mainstream, with a number of solutions being aimed at the consumer market. A number of standards are also under development by a number of standardization bodies. Such standardization activities are actively developing standards for the various aspects of VR/AR systems including e.g. streaming, broadcasting, rendering, etc.

VR applications tend to provide user experiences corresponding to the user being in a different world/environment/scene whereas AR (including Mixed Reality MR) applications tend to provide user experiences corresponding to the user being in the current environment but with additional information or virtual objects or information being added. Thus, VR applications tend to provide a fully immersive synthetically generated world/scene whereas AR applications tend to provide a partially synthetic world/scene which is overlaid the real scene in which the user is physically present. However, the terms are often used interchangeably and have a high degree of overlap. In the following, the term Virtual Reality/VR will be used to denote both Virtual Reality and Augmented Reality.

As an example, a service being increasingly popular is the provision of images and audio in such a way that a user is able to actively and dynamically interact with the system to change parameters of the rendering such that this will adapt to movement and changes in the user's position and orientation. A very appealing feature in many applications is the ability to change the effective viewing position and viewing direction of the viewer, such as for example allowing the viewer to move and "look around" in the scene being presented.

Such a feature can specifically allow a virtual reality experience to be provided to a user. This may allow the user to (relatively) freely move about in a virtual environment and dynamically change his position and where he is looking. Typically, such virtual reality applications are based on a three-dimensional model of the scene with the model being dynamically evaluated to provide the specific requested view. This approach is well known from e.g. game applications, such as in the category of first person shooters, for computers and consoles.

It is also desirable, in particular for virtual reality applications, that the image being presented is a three-dimensional image. Indeed, in order to optimize immersion of the viewer, it is typically preferred for the user to experience the presented scene as a three-dimensional scene. Indeed, a virtual reality experience should preferably allow a user to select his/her own position, camera viewpoint, and moment in time relative to a virtual world.

Typically, virtual reality applications are inherently limited in being based on a predetermined model of the scene, and typically on an artificial model of a virtual world. In some applications, a virtual reality experience may be provided based on real-world capture. In many cases such an approach tends to be based on a virtual model of the real-world being built from the real-world captures. The virtual reality experience is then generated by evaluating this model.

Many current approaches tend to be suboptimal and tend to often have a high computational or communication resource requirement and/or provide a suboptimal user experience with e.g. reduced quality or restricted freedom.

As an example of an application, virtual reality glasses have entered the market which allow viewers to experience captured 360° (panoramic) or 180° video. These 360° videos are often pre-captured using camera rigs where individual images are stitched together into a single spherical mapping. Common stereo formats for 180° or 360° video are top/bottom and left/right. Similar to non-panoramic stereo video, the left-eye and right-eye pictures are compressed, e.g. as part of a single H.264 video stream.

In addition to the visual rendering, most VR/AR applications further provide a corresponding audio experience. In many applications, the audio preferably provides a spatial audio experience where audio sources are perceived to arrive from positions that correspond to the positions of the corresponding objects in the visual scene. Thus, the audio and video scenes are preferably perceived to be consistent and with both providing a full spatial experience.

For audio, the focus has until now mostly been on headphone reproduction using binaural audio rendering technology. In many scenarios, headphone reproduction enables a highly immersive, personalized experience to the user. Using headtracking, the rendering can be made responsive to the user's head movements, which highly increases the sense of immersion.

Recently, both in the market and in standards discussions, use cases are starting to be proposed that involve a "social" or "shared" aspect of VR (and AR), i.e. the possibility to share an experience together with other people. These can be people at different locations, but also people in the same location (or a combination of both). For example, several people in the same room may share the same VR experience with a projection (audio and video) of each participant being present in the VR content/scene. For example, in a game where multiple people participate, each player may have a different location in the game-scene and consequently a different projection of the audio and video scene.

As a specific example, MPEG attempts to standardize a bit stream and decoder for realistic, immersive AR/VR experiences with six degrees of freedom. Social VR is an important feature and allows users to interact in a shared environment (gaming, conference calls, online shopping, etc.). The concept of social VR also facilitates making a VR experience a more social activity for users physically in the same location but where e.g. a head mounted display or other VR headset provides a perceptional isolation from the physical surroundings.

A particular example of social VR applications is a conference application where users in different locations may share a virtual "meeting room" with users e.g. being represented by avatars. As another example, each user may be presented with a representation of other participants being virtually rendered in the user's own local environment, e.g. by overlaying the real world using AR glasses with avatars corresponding to other users such that the avatars give the impression of them being present in the room. Further, the individual user may be provided with an audio scene that includes the relevant audio from all other participants and with this audio being spatially rendered at appropriate perceived audio source positions. This audio and video rendering is performed such that the visual and audio positions for a given participant correspond to each other.

In order to provide the optimum experience, it is desirable for the audio and video perception to align closely, and in particular for AR applications it is desirable for this to further align with the real-world scene. However, this is often difficult to achieve as there may be a number of issues that can impact the user's perception. For example, in practice the user will typically use the apparatus in a location that cannot be guaranteed to be completely silent or dark. Although headsets may seek to block out light and sound, this will typically only partially be achieved. Further, in AR applications, it is often part of the experience that the user can experience the local environment as well, and it is therefore not practical to block this environment out completely.

Hence, an improved approach for generating audio, in particular for a virtual/augmented reality experience/application, such as e.g. a VR/AR conference application, would be advantageous. In particular, an approach that allows improved operation, increased flexibility, reduced complexity, facilitated implementation, an improved audio experience, a more consistent perception of an audio and visual scene, reduced error sensitivity to sources in a local environment; an improved virtual reality experience, and/or improved performance and/or operation would be advantageous.

SUMMARY OF THE INVENTION

Accordingly, the Invention seeks to preferably mitigate, alleviate or eliminate one or more of the above mentioned disadvantages singly or in any combination.

According to an aspect of the invention there is provided an audio apparatus for an audio distribution system comprising an audio server for receiving incoming audio from a plurality of remote clients and for transmitting audio derived from the incoming audio to at least some of the plurality of remote clients; the apparatus comprising: a receiver for receiving data comprising: audio data for a plurality of audio components, each audio component representing audio from a remote client of the plurality of remote clients; proximity data for at least one of the audio components, the proximity data being indicative of proximity between remote clients; and a generator for generating an audio mix of the plurality of audio components in response to the proximity data.

The invention may provide an improved user experience in many embodiments and may specifically provide improved audio distribution in many applications, such as specifically conference applications based on an AR/VR approach. The approach may provide improved audio perception in scenarios in which users/participants are e.g. in the same room. An improved and more natural perception of the audio scene may typically be achieved and in many scenarios interference and inconsistency resulting from colocated users/clients may be mitigated or reduced. The approach may be particularly advantageous for Virtual Reality, VR, (including Augmented Reality, AR) applications. It may for example provide an improved user experience for e.g. social VR/AR applications wherein a plurality of participants is present in the same location.

The approach may in many embodiments provide improved performance while maintaining low complexity and resource usage.

The proximity data may specifically be acoustic proximity data. The proximity data may comprise proximity indications for sets (typically pairs) of remote clients. A proximity indication for a set of remote clients may be indicative of a spatial distance between the remote clients and/or associated audio sources/users, or may e.g. be indicative of an acoustic attenuation between the remote clients and/or associated audio sources/users.

The audio mix may be a set of audio signals/channels (potentially) comprising contributions from a plurality of the audio components.

The proximity data may be indicative of a real world/absolute/physical proximity between remote clients. The proximity data may specifically reflect the actual physical proximity between remote clients in the real world acoustic environment.

In accordance with an optional feature of the invention, the generator is arranged to generate a first audio mix for a first remote client of the plurality of remote clients, the generation of the first audio mix including determining an attenuation in the first audio mix of a second audio component for a second remote client in response to the proximity data.

This may provide an improved user experience and/or improved performance and audio perception in many scenarios. It may in particular allow improved adaptation of the combined audio perception to the potential audio interference between the rendered audio scene and the real-world audio scene. The attenuation in the first audio mix of the second audio component for the second remote client may be in response to a proximity indication in the proximity data, the proximity indication being indicative of a proximity/distance between the first remote client and the second remote client.

In accordance with an optional feature of the invention, the generator is arranged to attenuate the second audio component in the first audio mix for the proximity data meeting a proximity criterion for the first remote client and the second remote client.

This may provide an improved user experience and/or improved performance and audio perception in many scenarios. The generator may be arranged to attenuate the second audio component for the proximity data indicating a distance measure between the first remote client and the second remote client below a threshold. The attenuation may be infinite. Specifically, the generator may be arranged to suppress/discard/exclude the second audio component for the proximity data meeting the proximity criterion for the first remote client and the second remote client.

In accordance with an optional feature of the invention, the audio apparatus is part of the audio server.

This may provide high performance and efficient implementation in many embodiments.

In accordance with an optional feature of the invention, the audio apparatus is part of a remote client of the plurality of remote clients.

This may provide high performance and efficient implementation in many embodiments.

In accordance with an optional feature of the invention, the proximity data comprises a scalar proximity indication for at least a first remote client and a second remote client, the scalar proximity indication being indicative of an acoustic attenuation from an audio source of the second remote client to a capture element of the first remote client.

This may provide particularly advantageous operation in many embodiments. In some embodiments, the scalar proximity indication may be a binary proximity indication indicative of whether the corresponding remote clients are proximal or not (e.g. in the same room).

In accordance with an optional feature of the invention, the proximity data comprises a different proximity indication from a first remote client to a second remote client than from the second remote client to the first remote client.

This may provide advantageous operation in many scenarios. The approach may allow and support asymmetric proximity indications e.g. reflecting local acoustic differences (such as when using directional microphones or a participant wears closed headphones).

In accordance with an optional feature of the invention, the receiver is arranged to receive proximity data dynamically adapting to changes in positions of at least one of the plurality of remote clients.

This may provide efficient operation and may provide an approach dynamically adapting to user movements.

According to an aspect of the invention there is provided an audio distribution system comprising: a plurality of remote clients; an audio server for receiving incoming audio from the plurality of remote clients and for transmitting audio derived from the incoming audio to at least one of the plurality of remote clients; wherein at least one of the audio server and one of the plurality of remote clients comprises: a receiver for receiving data comprising: audio data for a plurality of audio components, each audio component representing audio from a remote client of the plurality of remote clients; proximity data for at least one of the audio components, the proximity data being indicative of proximity between remote clients; a generator for generating an audio mix of the plurality of audio components in response to the proximity data.

In accordance with an optional feature of the invention, the audio distribution system comprises a proximity detector arranged to determine a proximity indication for a first remote client and a second remote client in response to a comparison of a first audio component for the first remote client and a second audio component for a second remote client; and a transmitter for transmitting proximity data comprising the proximity indication to the receiver.

This may provide particularly advantageous performance and low complexity in many embodiments.

In accordance with an optional feature of the invention, the proximity detector is part of the audio server.

This may provide particularly advantageous performance and low complexity in many embodiments.

In accordance with an optional feature of the invention, a first remote client of the plurality of remote clients comprises: an input for generating a microphone signal corresponding to audio captured by a set of microphones; a proximity detector arranged to determine a proximity indication for the first remote client in response to a comparison of the microphone signal and audio received from the audio server; and a transmitter for transmitting acoustic audio data comprising the proximity indication to the audio server.

This may provide particularly advantageous performance and low complexity in many embodiments. The set of microphones may in some embodiments include a single microphone or may e.g. comprise a plurality of microphones, such as for example an array of microphones, e.g. used for beamforming/directional capture.

In accordance with an optional feature of the invention, the transmitter is arranged to transmit proximity data being indicative of a currently active remote client being determined to be proximal in response to the first proximity detector detecting a high correlation between the microphone signal and the audio received from the audio server.

This may provide particularly advantageous performance and low complexity in many embodiments.

According to an aspect of the invention there is provided a method of operation of an audio apparatus for an audio distribution system comprising an audio server for receiving incoming audio from a plurality of remote clients and for transmitting audio derived from the incoming audio to at least some of the plurality of remote clients; the method comprising: receiving data comprising: audio data for a plurality of audio components, each audio component representing audio from a remote client of the plurality of remote clients; proximity data for at least one of the audio components, the proximity data being indicative of proximity between remote clients; and generating an audio mix of the plurality of audio components in response to the proximity data.

These and other aspects, features and advantages of the invention will be apparent from and elucidated with reference to the embodiment(s) described hereinafter.

BRIEF DESCRIPTION OF THE DRAWINGS

Embodiments of the invention will be described, by way of example only, with reference to the drawings, in which.

DETAILED DESCRIPTION OF SOME EMBODIMENTS OF THE INVENTION

Figure 1:
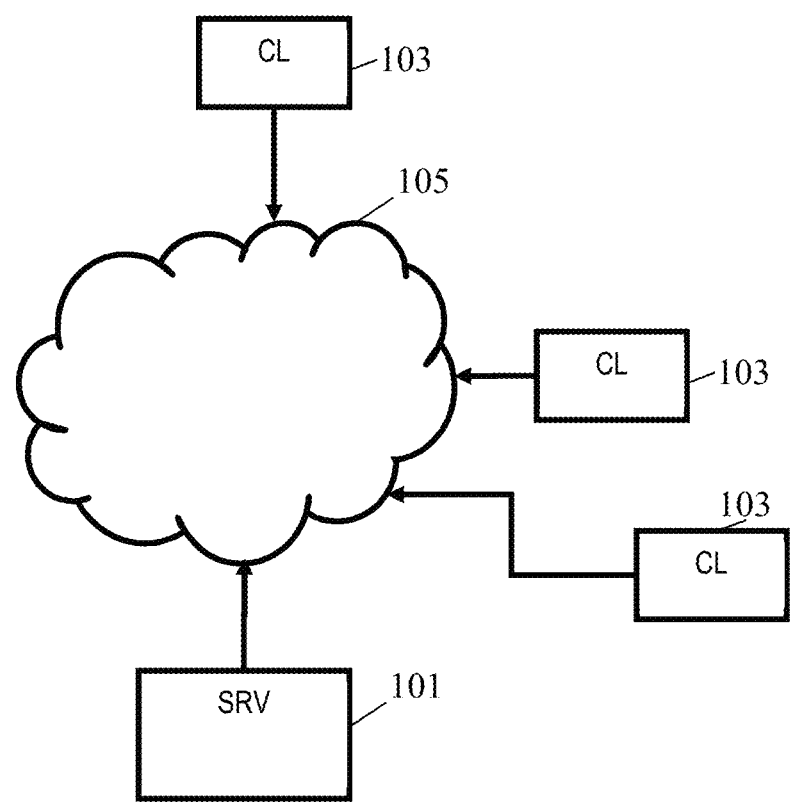
FIG. 1 illustrates an example of an audio distribution system.

Virtual (including augmented) experiences allowing a user to move around in a virtual or augmented world are becoming increasingly popular and services are being developed to satisfy such demands. In many such approaches, visual and audio data may dynamically be generated to reflect a user's (or viewer's) current pose.

In the field, the terms placement and pose are used as a common term for position and/or direction/orientation. The combination of the position and direction/orientation of e.g. an object, a camera, a head, or a view may be referred to as a pose or placement. Thus, a placement or pose indication may comprise up to six values/components/degrees of freedom with each value/component typically describing an individual property of the position/location or the orientation/direction of the corresponding object. Of course, in many situations, a placement or pose may be represented by fewer components, for example if one or more components is considered fixed or irrelevant (e.g. if all objects are considered to be at the same height and have a horizontal orientation, four components may provide a full representation of the pose of an object). In the following, the term pose is used to refer to a position and/or orientation which may be represented by one to six values (corresponding to the maximum possible degrees of freedom).

Many VR applications are based on a pose having the maximum degrees of freedom, i.e. three degrees of freedom of each of the position and the orientation resulting in a total of six degrees of freedom. A pose may thus be represented by a set or vector of six values representing the six degrees of freedom and thus a pose vector may provide a three-dimensional position and/or a three-dimensional direction indication. However, it will be appreciated that in other embodiments, the pose may be represented by fewer values.

A system or entity based on providing the maximum degree of freedom for the viewer is typically referred to as having 6 Degrees of Freedom (6 DoF). Many systems and entities provide only an orientation or position and these are typically known as having 3 Degrees of Freedom (3 DoF).

Typically, the virtual reality application generates a three-dimensional output in the form of separate view images for the left and the right eyes. These may then be presented to the user by suitable means, such as typically individual left and right eye displays of a VR headset. In other embodiments, one or more view images may e.g. be presented on an autostereoscopic display, or indeed in some embodiments only a single two-dimensional image may be generated (e.g. using a conventional two-dimensional display).

Similarly, for a given viewer/user/listener pose, an audio representation of the scene may be provided. The audio scene is typically rendered to provide a spatial experience where audio sources are perceived to originate from desired positions. As audio sources may be static in the scene, changes in the user pose will result in a change in the relative position of the audio source with respect to the user's pose. Accordingly, the spatial perception of the audio source should change to reflect the new position relative to the user. The audio rendering may accordingly be adapted depending on the user pose.

In many embodiments, the audio rendering is a binaural rendering using Head Related Transfer Functions (HRTFs) or Binaural Room Impulse Responses (BRIRs) (or similar) to provide the desired spatial effect for a user wearing a headphone. However, it will be appreciated that in some systems, the audio may instead be rendered using a loudspeaker system and the signals for each loudspeaker may be rendered such that the overall effect at the user corresponds to the desired spatial experience.

The viewer or user pose input may be determined in different ways in different applications. In many embodiments, the physical movement of a user may be tracked directly. For example, a camera surveying a user area may detect and track the user's head (or even eyes (eye-tracking)). In many embodiments, the user may wear a VR headset which can be tracked by external and/or internal means. For example, the headset may comprise accelerometers and gyroscopes providing information on the movement and rotation of the headset and thus the head. In some examples, the VR headset may transmit signals or comprise (e.g. visual) identifiers that enable an external sensor to determine the position of the VR headset.

In some systems, the viewer pose may be provided by manual means, e.g. by the user manually controlling a joystick or similar manual input. For example, the user may manually move the virtual viewer around in the virtual scene by controlling a first analog joystick with one hand and manually controlling the direction in which the virtual viewer is looking by manually moving a second analog joystick with the other hand.

In some applications a combination of manual and automated approaches may be used to generate the input viewer pose. For example, a headset may track the orientation of the head and the movement/position of the viewer in the scene may be controlled by the user using a joystick.

In some systems, the VR application may be provided locally to a viewer by e.g. a standalone device that does not use, or even have any access to, any remote VR data or processing. For example, a device such as a games console may comprise a store for storing the scene data, input for receiving/generating the viewer pose, and a processor for generating the corresponding images from the scene data.

In other systems, the VR application may be implemented and performed remote from the viewer. For example, a device local to the user may detect/receive movement/pose data which is transmitted to a remote device that processes the data to generate the viewer pose. The remote device may then generate suitable view images for the viewer pose based on scene data describing the scene. The view images are then transmitted to the device local to the viewer where they are presented. For example, the remote device may directly generate a video stream (typically a stereo/3D video stream) which is directly presented by the local device. Similarly, the remote device may generate an audio scene reflecting the virtual audio environment. This may in many embodiments be done by generating audio signals that correspond to the relative position of different audio sources in the virtual audio environment, e.g. by applying binaural processing to the individual audio components corresponding to the current position of these relative to the head pose. Thus, in such an example, the local device may not perform any VR processing except for transmitting movement data and presenting received video and audio data.

Similarly, the remote VR device may generate audio data representing an audio scene and may transmit audio components/objects corresponding to different audio sources in the audio scene together with position information indicative of the position of these (which may e.g. dynamically change for moving objects). The local VR device may then render such signals appropriately, e.g. by applying appropriate binaural processing reflecting the relative position of the audio sources for the audio components.

For the audio side, a central server may accordingly in some embodiments generate a spatial audio mix that can be rendered directly by the remote client device. For example, the central server may generate spatial audio as a number of audio channels for direct rendering by a surround sound loudspeaker setup. However, more commonly, the central server may generate a mix by binaurally processing all audio signals in the scene to be rendered and then combining these into a binaural stereo signal which can be rendered directly at the client side using a set of headphones.

In many applications, the central server may instead provide a number of audio objects or components with each of these corresponding typically to a single audio source. The client can then process such objects/components to generate the desired audio scene. Specifically, it may binaurally process each audio object based on the desired position and combine the results.

In such systems, audio data transmitted to a remote client may include data for a plurality of audio components or objects. The audio may for example be represented as encoded audio for a given audio component which is to be rendered. The audio data may further comprise position data which indicates a position of the source of the audio component. The positional data may for example include absolute position data defining a position of the audio source in the scene. The local apparatus may in such an embodiment determine a relative position of the audio source relative to the current user pose. Thus, the received position data may be independent of the user's movements and a relative position for audio sources may be determined locally to reflect the position of the audio source with respect to the user. Such a relative position may indicate the relative position of where the user should perceive the audio source to originate from, and it will accordingly vary depending on the user's head movements. In other embodiments, the audio data may comprise position data which directly describes the relative position.

FIG. 1 illustrates an example of a VR system in which a central server 101 liaises with a number of remote clients 103 e.g. via a network 105, such as the Internet. The central server 101 may be arranged to simultaneously support a potentially large number of remote clients 103.

Such an approach may in many scenarios provide an improved trade-off e.g. between complexity and resource demands for different devices, communication requirements etc. For example, the viewer pose and corresponding scene data may be transmitted with larger intervals with the local device processing the viewer pose and received scene data locally to provide a real time low lag experience. This may for example substantially reduce the required communication bandwidth while providing a low latency experience and while allowing the scene data to be centrally stored, generated, and maintained. It may for example be suitable for applications where a VR experience is provided to a plurality of remote devices.

Figure 2:
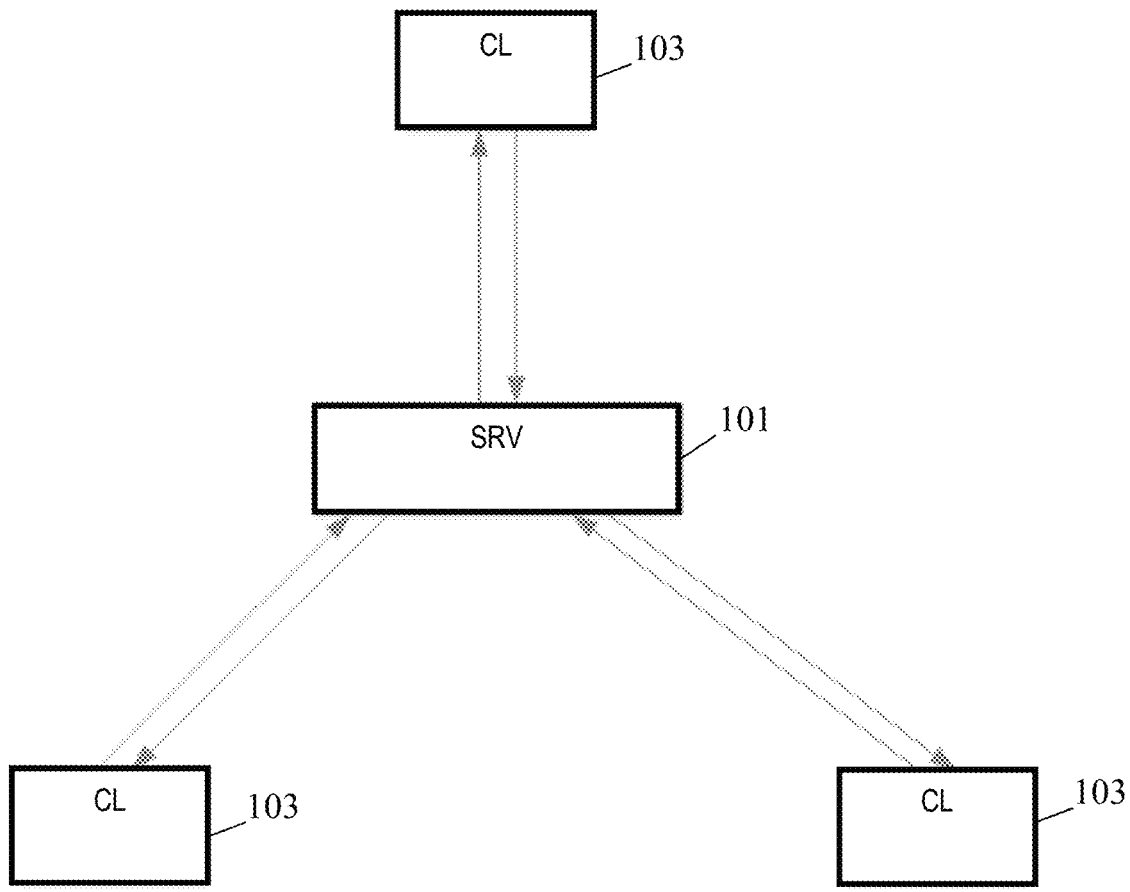
FIG. 2 illustrates an example of an audio distribution system.

A particularly attractive VR/AR application is a virtual teleconference application where users/participants may be in different locations. An example of such an application is illustrated in FIG. 2 which shows a central server 101, corresponding to the central server of FIG. 1, supporting a plurality of remote (audio) clients 103. As can be seen, all of the remote clients 103 communicate directly with the central server 101 rather than with each other. Thus, each remote client 103 may upload an audio component corresponding to one or more local audio sources for the remote client 103 to the central server 101. The central server 101 may transmit audio data to the individual remote client 103 which represents the audio from other remote clients 103. Typically, each user or participant will have a separate device implementing a remote client 103 although of course a remote client may in some embodiments and scenarios be shared by a plurality of users/participants.

However, the Inventors have realized that an issue for many such practical systems and applications is that audio in the local environment may impact the user experience. In practice, it tends to be difficult to completely suppress audio in the local environment and indeed even when wearing headphones there is typically a perceivable contribution from the local environment to the perceived audio. In some cases, such sounds may be suppressed using e.g. active noise cancellation. However, this is not practical for audio sources that have a direct counterpart in the VR scene and often tends to be imperfect.

Indeed, the problem of interference between real environment sounds and audio scene sounds is particularly problematic for applications that provide a VR experience that also reflects the local environment, such as for example many AR experiences.

For example, applications are being pursued which include a "social" or "shared" aspect of VR where for example a plurality of people in the same local environment (e.g. room) share a common experience. Such "social" or "shared" use cases are being proposed e.g. in MPEG, and are now one of the main classes of experience for the current MPEG-I standardization activity. An example of such an application is where several people are in the same room and share the same VR experience with a projection (audio and video) of each participant also being present in the VR content.

In such an application, the VR environment may include an audio source corresponding to each participant but in addition to this, the user may, e.g. due to typical leakage of headphones, also hear other participants directly if they are present locally. Indeed, in many situations a participant may intentionally wear open headphones in order to hear the local environment. This interference may be detrimental to the user experience and may reduce immersion for the participant. However, performing noise cancellation on the real sound component is very difficult and is computationally very expensive. Most typical noise cancelling techniques are based on a microphone within the headphone together with a feedback loop minimizing (preferably completely) any real world signal component in the microphone signal (the microphone signal may be considered the error signal driving the loop). However, such an approach is not feasible when it is desired for the audio source to actually be present in the perceived audio.

The Inventors have realized that for a conferencing system such as that of FIG. 2, the audio experience may be degraded particularly when different users/participants are in the same physical location and each user has their own microphone and connection to the conferencing server, i.e. when different colocated users use different remote clients. A conferencing server may send each remote client a unique mix including all incoming signals from other remote clients. In case users are in the same physical location they typically hear the other users in the location acoustically (depending on how acoustically open the headphones are) but also through their headphones as the received audio includes the audio component from the remote client of the other user. The delay on this conferencing connection is typically large enough to make this a very unpleasant experience.

This is a particular significant issue for AR/VR as this adds a visual component. If a remote person joins an AR experience, this person may also be rendered visually, e.g. through an avatar.

Even if all users wear sufficiently closed headphone sets to reduce external sound levels for the user (the most likely use-case for VR), there is still a (direct acoustic) component of each user's speech to all microphone signals that are recorded in the common location. This may cause artefacts because the speech arrives with slightly different delays at the different microphones and thus is mixed with slightly different delays (and more attenuated versions) of itself. A result could be an effect corresponding to a comb-filtering being applied.

Thus, local sound sources may interfere both with the user's audio perception of the rendered audio stage as well as with the capture of the sound of the individual participant.

Although conferencing systems may mute or attenuate users with low level microphone signals in order to improve intelligibility of the active speech by removing noise or background sounds from microphones of participants that are not speaking, this tends to not fully address the problem. For example, if other participants' microphones pick up speech with a sufficiently high level, they may not be muted or attenuated resulting in a reduced signal to noise ratio.

Figure 3:
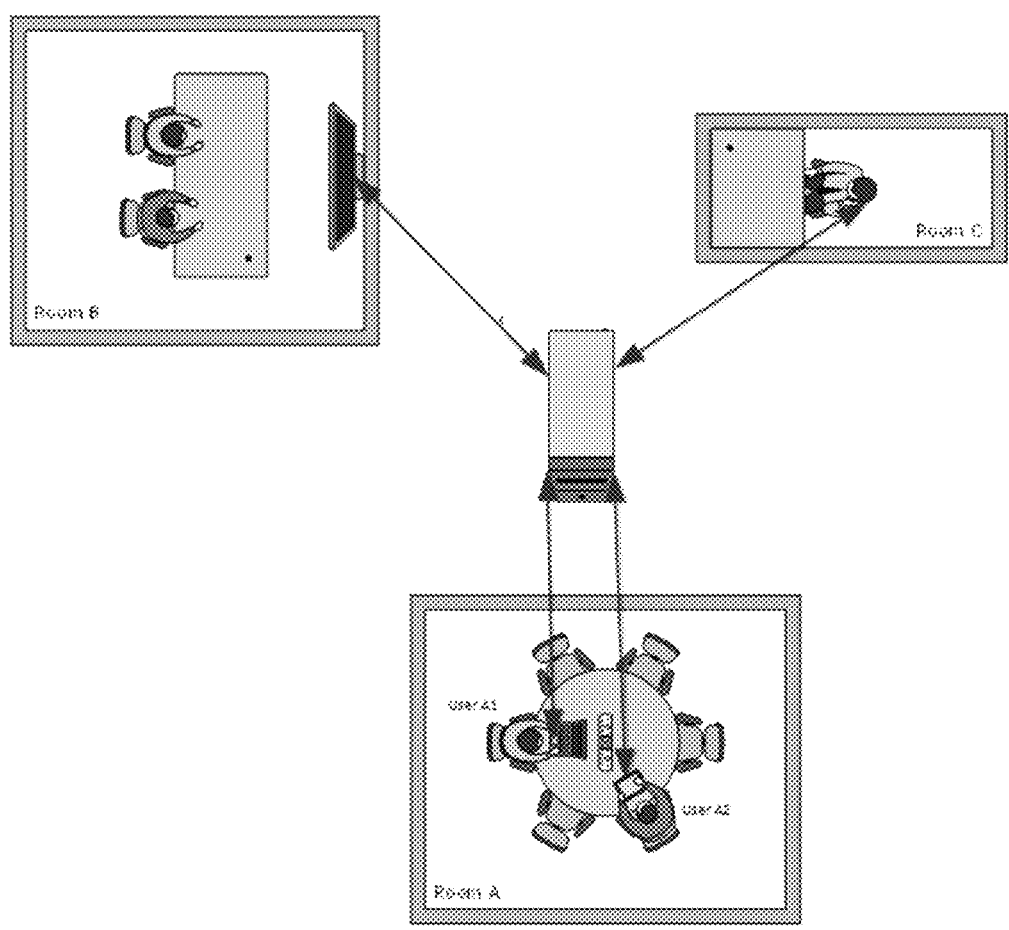
FIG. 3 illustrates an example of an audio distribution system for audio conferencing.

The issue may be illustrated by the example of FIG. 3. The scenario of Room A results in possibly severe artefacts in current conferencing systems. With two connections to the server, user A1's device plays the delayed speech of user A2 and vice versa.

Typically, for two or more connections being used in the same room, or at least in each other's vicinity, each user's audio from the conference server will exclude its own microphone signal, but include the audio from all other users with a latency determined by the conferencing codec, -system, and the connections between the users and the server etc. For typical conferencing systems these delays will be less than 500 ms.

This situation has several disadvantages:
- A user hearing his own speech with a delay (Delayed Auditory Feedback) is very annoying and known to cause mental stress.
- If user A1 is talking, it will negatively affect speech intelligibility for the other person(s) in the room, which increases listening effort and fatigue.
- If user A1 is talking, the delayed speech from other users' client speakers in the room is also picked up by user A1's microphone which will again be played back over the other users' speakers, etc. potentially causing acoustic feedback ('ringing').
- If user A1 is talking, it will also be picked up by the microphones of all other users which can cause problems for the conference system determining which person is talking (preventing the system from muting or attenuating others to manage SNR), or cause build-up of signal level.

In the following an approach will be described which may typically mitigate such effects and disadvantages. The approach is based on generating and distributing metadata indicative of the acoustic/spatial relationship between different remote clients. For example, meta data may be generated which indicates which (if any) remote clients are colocated, and specifically indicative of whether remote clients are in the same room (the position of a remote client may e.g. be considered to correspond to the position of the capture of local audio, such as e.g. the position of one or more microphones capturing the local audio). The metadata may be distributed e.g. to a central server or (other) remote clients where they may be used in the generation of suitable audio (as well as potentially also for other purposes).

Figure 4:
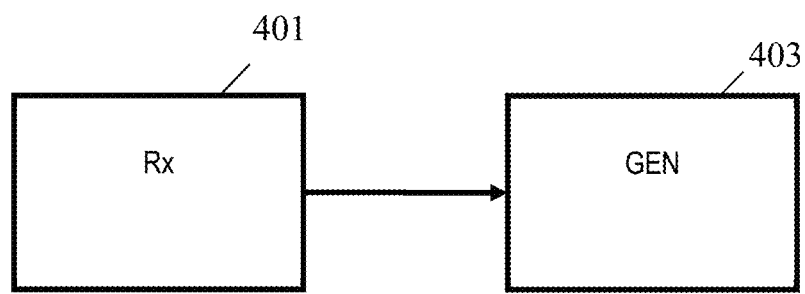
FIG. 4 illustrates an example of elements of an audio apparatus in accordance with some embodiments of the invention.

FIG. 4 illustrates examples of an audio apparatus for an audio distribution system that includes an audio server serving a plurality of remote clients and being arranged to receive and transmit audio from/to the remote clients. The following description will focus on an audio distribution system in the form of a VR conference system, and will specifically be described with reference to a system such as that of FIGS. 1-3. However, it will be appreciated that the general approach and principles are not limited to such an audio conference system but may be applied to many other audio distribution systems and applications, such as other social AR services.

The central server 101 will thus in the following be referred to as an audio server 101. It specifically supports an audio conference application and may therefore be considered a conference server. Similarly, each of the remote clients 103 represents a conference participant/user (or potentially a plurality thereof) and serves the function of capturing/generating an audio component representing the sound/audio for the participant and of rendering the combined conference audio scene to the user. Each remote client may in addition comprise functionality for generating a corresponding visual scene, e.g. by generating a fully virtual scene with avatars representing other participants, or e.g. by generating visual overlays for an AR headset. The audio and visual scenes are generated to be consistent and to provide an integrated rendering of a suitable conference scenario.

Typically, each remote client comprises at least one microphone arranged to capture sound. The remote client is further arranged to generate an audio component from the captured microphone signal and this audio component may be transmitted to the audio server 101.

The audio server 101 receives the audio components from the different remote clients 103. The audio server 101 then transmits audio to each of the remote clients 103 reflecting the audio components received from other remote clients 103. In some embodiments, the audio server 101 may forward the received audio components such that the remote clients 103 receive audio components from other remote clients 103. In other embodiments, the audio server 101 may generate a combined audio mix representation (e.g. a surround sound signal, binaural signals or a mono signal) by combining the audio components for the appropriate remote clients 103. In such embodiments, the audio server 101 may generate a specific audio downmix for each remote client 103. The audio mix may include audio signals representing audio components from a plurality of remote clients 103.

The audio apparatus of FIG. 2 comprises a receiver 401 which is arranged to receive audio data and associated metadata comprising proximity data.

The receiver 401 is specifically arranged to receive a plurality of audio components each of which represent sound from a remote client. Thus, the audio apparatus receives a plurality of audio components with each of these being associated with a remote client 103 from which it is received. Each audio component may specifically correspond to the audio/sound captured by a set of microphones at the remote client 103.

In addition, the receiver 401 receives proximity data for at least one, and typically some, or indeed all, of the audio components. The proximity data provides relationship data that provides information on the acoustic/spatial relationship between remote clients 103.

The proximity data is specifically indicative of the proximity between remote clients of the plurality of remote clients. The proximity indication from a first remote client to a second remote client may reflect the (real world) acoustic attenuation (specifically of sound propagation by vibrations in air or other mediums) from an audio source for the first remote client (such as a speaking participant associated with the first remote client) to a position associated with the second remote client. This position may specifically be the position of a microphone of the first remote client capturing a signal from which the audio component for the first remote client is generated, or may e.g. be a position of a user (and specifically the ears of a user) or users.

Thus, the proximity data may specifically be acoustic proximity data, and may comprise proximity indications for remote clients, such as proximity indications for pairs or sets of remote clients 103.

The proximity data/proximity indication may accordingly reflect the acoustic transfer function/attenuation from a position of the first remote client to a position of the second remote client. The proximity indication for a first remote client to a second remote client may reflect the degree or level of audio associated with the second remote client interferes with audio associated with the first remote client.

The proximity indication from a first remote client to a second remote client may specifically reflect the amount of audio from an audio source associated with the second remote client which is captured in the audio component of the first remote client. Specifically, the proximity indication may reflect how much audio from a speaker/participant for the second remote client is captured by the first remote client.

The proximity data/indications may in many scenarios correspond directly to a spatial proximity and the term spatial proximity may be used. The proximity data may thus be data indicative of the spatial proximity of different remote clients. In many embodiments, the proximity data may provide information of which remote clients are proximal and specifically colocated. Remote clients may be considered to be colocated/proximal if audio represented by the audio component of one remote client may also be captured by another remote client. In some embodiments, remote clients may be considered to be colocated/proximal if the positions of the remote clients meet a distance criterion, such as for example that the spatial distance is less than a threshold or that the remote clients are in the same room. In some embodiments, hysteresis may be built into the threshold in order to avoid toggling of the decision.

The proximity data may be indicative of a real-world proximity between the remote clients, and specifically of the real-world acoustic/sound propagation proximity between remote clients. The proximity indication may be independent of a desired positions of the corresponding audio in the generated audio scene of the audio mix. The proximity indication may be independent of virtual (audio) scene positions. The proximity indication/data may be indicative of real-world spatial/acoustic properties. Thus, rather than reflecting some form of desired proximity between audio to be rendered, the proximity data reflects that actual physical proximity and acoustic environment between remote clients. The proximity data is not reflecting some form of imaginary, theoretical, virtual, or desired proximity e.g. of some non-physical realm but reflects the real-world (typically acoustic) proximity.

In many embodiments, proximity indications may be symmetric, i.e. the same proximity indication/measure may apply to the proximity from a first remote client to a second remote client as well as from the second remote client to the first remote client. However, in some embodiments, asymmetric proximity indications may apply. For example, for remote clients using directional microphones, the attenuation at a second remote client of a speaker associated with a first remote client may be different than the attenuation at the first remote client of a speaker associated with the second remote client. Similarly, when the proximity data includes a position at the ears of a participant/user of the first remote client wearing headphones, the attenuation depends on the acoustic attenuation exerted by the headphones and may be different from the attenuation to the ears of a participant/user of the second remote client.

The receiver 401 thus receives proximity data which may represent spatial/acoustic interrelationships between the remote clients 103 and specifically may indicate which remote clients 103 are colocated/proximal, such as e.g. in the same room.

The receiver 401 is coupled to a generator 403 which receives the audio components and the proximity data. The generator is arranged to generate an audio mix of the plurality of audio components in response to the proximity data. The audio mix may comprise a plurality of audio components from different remote clients combined into a set of signals. At least one of the signals may comprise audio from a plurality of audio components/remote clients.

For example, the generator 403 may generate a surround sound downmix or a binaural stereo signal by combining/downmixing the audio component into channels. The downmix is further made depending on the proximity data such that e.g. the level of the audio components is dependent on the proximity data.

The generator 403 may specifically be arranged to generate an audio signal for one specific remote client by combining all the audio components except for the audio components of remote clients that are indicated by the proximity data to be colocated with the specific remote client for which the audio signal is generated.

In the system, metadata comprising proximity data is included in the bitstreams of an audio distribution system indicating e.g. which users/clients share a physical location. The metadata can for example be used to determine which signals to play back at each conferencing participant. E.g. the audio signals played for the participants sharing a common location may not include the captured signals from each other, but only from remote users, while their speech is sent to remote users. This can for example avoid mental stress, fatigue and audio artefacts due to the conferencing system latency, avoid acoustic feedback and/or to avoid lowering SNR.

Instead of directly excluding the audio for colocated users/remote clients, the generator 403 may instead provide a more gradual attenuation of the audio component of other colocated users.

Thus, in many embodiments, the generator 403 may be arranged to generate the mix for a first remote client wherein the attenuation/weighting of an audio component from a second remote client is dependent on whether the proximity data indicates that the second remote client is close to the first remote client.

In some embodiments, the proximity data may comprise a scalar value indicative of the distance between the first and second remote client. The generator 403 may in some such embodiments be arranged to determine the attenuation as a monotonically decreasing function of the distance such that the closer the second remote client is to the first remote client, the lower is the weight/the higher the attenuation of the audio component. If the second remote client is very close to the first remote client, the first remote client may accordingly render an audio scene in which the audio for the second remote client is substantially attenuated. This may reflect that in such situations, the user of the first remote client will be able to hear the user of the second remote client directly. However, the further away the second remote client is, the louder is the rendered audio from this.

This may provide a particularly attractive performance in many embodiments. For example, in a situation where the audio conference application is used by a group of people of which some are at a concert in a large concert hall, the individual participant in the concert hall may be provided with a customized audio rendering wherein other participants not present are rendered at full volume whereas very close participants are rendered with very low volume and participants in the concert hall but at further distances are rendered with intermediate volumes. The approach may in many situations provide an improved balance between audio received directly by acoustic transmission in the local environment and audio provided by the conference application.

In some embodiments, the generator 403 may attenuate an audio component if the proximity data for the two remote clients meet a proximity criterion. The attenuation may be by a predetermined amount, which in many embodiments may be an infinite attenuation (corresponding to the audio component not being rendered or included in the generated audio mix at all).

In many embodiments the proximity criterion may comprise a requirement that a proximity indication for the two remote clients must indicate a distance below a threshold. If the proximity indication meets the requirement, the generator 403 may proceed to not select the corresponding audio component for inclusion in the generated audio mix. The threshold may be set to a low 'safe' value indicative of there being substantially no correlation.

The approach may often be used with binary proximity indications which indicate whether remote client pairs are considered colocated/proximal or not (e.g. in the same room). If so, the audio component of the other remote client is not included when generating audio signals for the individual remote client.

In some embodiments, the audio apparatus of FIG. 4 may be implemented as part of the audio server 101. In some embodiments, the downmixing of the audio components/objects from a plurality of remote clients 103 into a combined audio mix comprising audio components from a plurality of remote clients 103 may be done in the audio server 101. In such embodiments, the remote clients 103 transmit proximity data to the audio server 101 which may then use this in generating individual audio mixes for the remote clients 103. The audio server 101 may specifically generate an audio mix for each of the remote clients 103 by combining/downmixing the audio components received from the remote clients 103 considering the proximity data. As a specific example, the audio server 101 may generate downmixes including all the audio components except for those for which the proximity data indicates that the corresponding remote client is colocated with the remote client for which the audio mix is generated.

In some embodiments, the audio apparatus of FIG. 4 may be implemented as part of one of the remote clients 103, and indeed all remote clients may include such an audio apparatus. In some embodiments, the downmixing of the audio components/objects from a plurality of remote clients 103 into a combined audio mix comprising audio components from a plurality of remote clients 103 may be performed in the remote clients 103. In such embodiments, the audio server 101 may transmit both the audio component and the proximity data to the individual remote clients 103 which may then locally generate an audio mix and render this to the user. In some such embodiments, the audio server 101 may receive the audio components from the different remote clients 103 and forward all of these to the individual remote clients 103. In addition, the audio server 101 may in some embodiments receive proximity data from the remote clients 103 and distribute this proximity data to the other remote clients 103. In other embodiments, the audio server 101 may receive the audio components from the different remote clients 103 and then itself generate the proximity data based on the audio components. The individual remote client may e.g. generate a local downmix e.g. including all the audio components except for those for which the proximity data indicates that the corresponding remote client is colocated with the remote client generating the mix.

It will be appreciated that different approaches for determining proximity data may be used in different embodiments. In many embodiments, the proximity data may specifically be determined by comparing the different audio component to each other. The system may include a proximity detector which determines a proximity indication for two remote clients by comparing the two audio components from the two remote clients to each other. The proximity data may for example be generated to reflect the similarity between these signals, and specifically a cross-correlation measure may be generated with the proximity indication being generated from this cross-correlation measure. For example, the cross-correlation value may be used directly, or e.g. the proximity indication may be set to indicate that the two remote clients are colocated if the maximum cross-correlation measure within a certain lag range exceeds a given threshold. A transmitter may then generate the proximity data to include the proximity indication and transmit this (typically together with the audio component).

In embodiments where the audio apparatus is implemented in the remote clients 103, a proximity detector may be implemented in the audio server 101 that determines cross-correlation values for all audio component pairs and determines a proximity indication for each pair. Proximity data may be generated to include all the proximity indications, and this may be transmitted to all the remote clients 103, or e.g. only proximity data for a given remote client may be transmitted to that remote client. In addition, the audio server 101 may transmit the audio components and the client may proceed to locally generate an audio mix.

In embodiments where the audio apparatus is implemented in the audio server 101, a proximity detector may be implemented in the remote clients 103. Each remote client may include a proximity detector which correlates e.g. the local audio component with received audio components from other remote clients 103. A proximity indication may be generated for each of the received audio components and transmitted back to the audio server 101 together with the local audio component. The audio server 101 may then use such proximity data received from all the remote clients in generating audio mixes for the individual remote clients 103.

Figure 5:
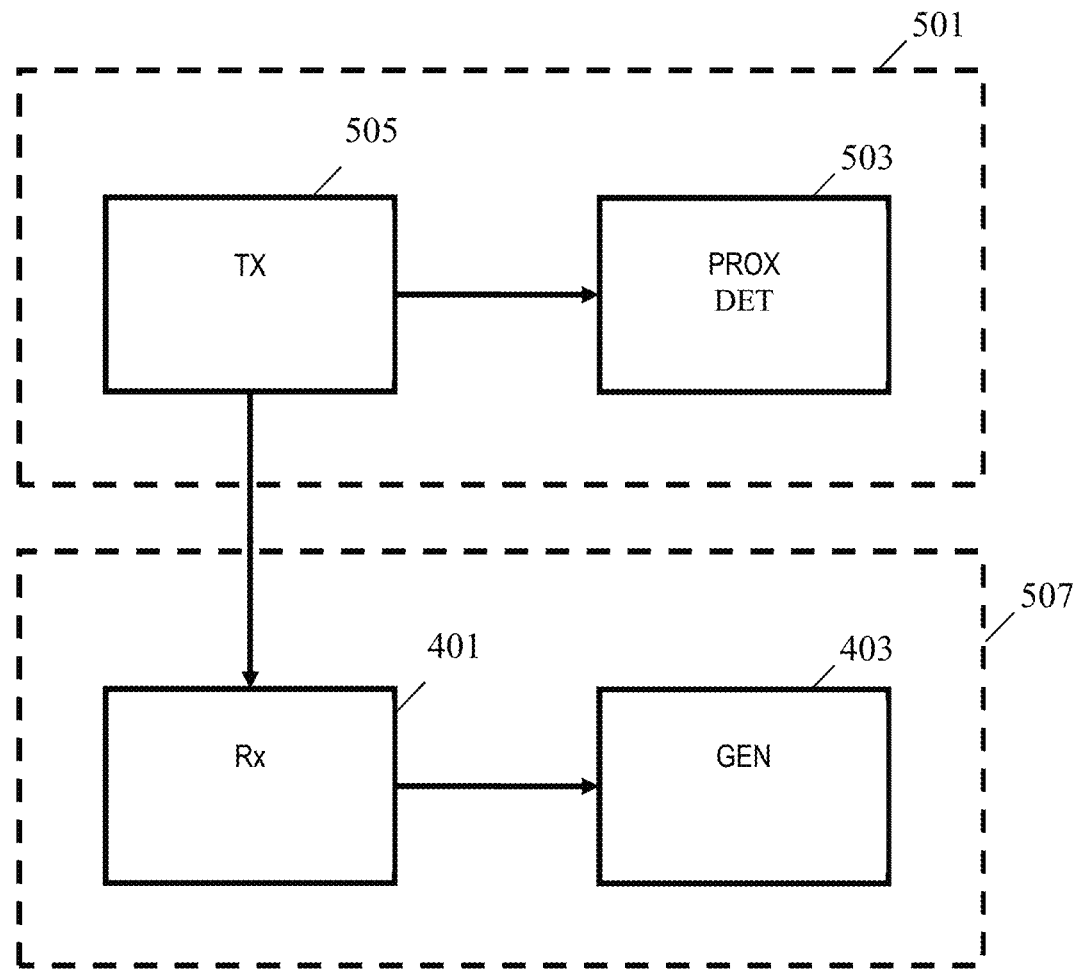
FIG. 5 illustrates an example of elements of an audio distribution system in accordance with some embodiments of the invention.

Thus, as illustrated in FIG. 5, a first entity 501 may comprise a proximity detector 503 that determines cross-correlation values for one or more audio component pairs and determines a proximity indication for each pair. For example, a first entity 501 may comprise a proximity detector 503 which determines a proximity indication for a first remote client and a second remote client in response to a comparison of a first audio component for the first remote client and a second audio component for a second remote client. It further comprises a data transmitter 505 which is arranged to transmit proximity data comprising the proximity indication to a second entity 507 which comprises the audio apparatus of FIG. 4. In addition to the proximity data, the transmitter 505 may transmit one or more audio components. The transmitter 505 may thus specifically transmit proximity data and audio component data to the receiver 401 of the audio apparatus. In some embodiments, the first entity

501 may be a remote client and the second entity 507 may be the audio server. In other embodiments, the first entity 501 may be the audio server and the second entity 507 may be a remote client.

Thus, in many embodiments, signal processing of the audio components (e.g. corresponding to microphone signals from the remote clients) in the audio server 101 may detect which users/remote clients are proximal (e.g. share a room), and the corresponding metadata will be sent to the remote clients 103.

If e.g. a correlation matrix is generated with maximum cross-correlation values for all audio component pairings in the matrix, the audio components for the remote clients 103 that are in the same room (proximal) will have a high maximum cross-correlation value.

For example, the audio server 101 can calculate for every unique combination of i and j, with i≠j:

$$\rho_{i,j} = \max \left( \max_{0 \leq \delta \leq \delta_{max}} \frac{\left\| \sum_{n=-(N_{hist}-\delta_{max})}^{0} x_i^*(n-\delta) \cdot x_j(n) \right\|}{\sqrt{\sum_{n=-(N_{hist}-\delta_{max})}^{0} x_i^*(n-\delta) \cdot x_i(n-\delta) \cdot \sum_{n=-(N_{hist}-\delta_{max})}^{0} x_j^*(n) \cdot x_j(n)}}, \right.$$

$$\left. \max_{-\delta_{max} \leq \delta < 0} \frac{\left\| \sum_{n=-(N_{hist}-\delta_{max})}^{0} x_i^*(n) \cdot x_j(n+\delta) \right\|}{\sqrt{\sum_{n=-(N_{hist}-\delta_{max})}^{0} x_i^*(n) \cdot x_i(n) \cdot \sum_{n=-(N_{hist}-\delta_{max})}^{0} x_j^*(n+\delta) \cdot x_j(n+\delta)}} \right)$$

where $x_i$ denotes the audio component signal that the server received from the remote client with index i, $\|x\|=\sqrt{x^* \cdot x}$ the norm, n the sample index to the (history of the) audio component with n=0 denoting the latest available sample, $N_{hist}$ the number of past samples used in the analysis and $\delta_{max}$ the maximum supported delay between the audio components.

For example, $\delta_{max}=\lfloor 0.3 \cdot f_s \rfloor$ and $N_{hist}=\lfloor 20 \cdot f_s \rfloor$ with $f_s$ the sample rate of the microphone signals and $\lfloor \cdot \rfloor$ the rounding down operation. A typical value for the sample rate for speech is 16 kHz. In case of audio, a higher sampling rate of e.g. 48 kHz is often used. Particularly, for this approach, the value of $\delta_{max}$ may be chosen large enough to account for delays between the audio components due to different acoustic path lengths between the users and the microphones (in the same room) and delay differences in the transmission from the remote clients to the audio server 101.

If for a certain combination of i and j the above cross-correlation is high, for example $\delta_{i,j} \geq 0.3$, remote clients i and j can be considered to be proximal, and specifically in the same room. Cross-correlations may be low when none of the participants is talking. Therefore, it is advantageous to calculate the cross-correlation only when one of the participants i or j is active.

As an example, determining whether user k is active can be done according to:

$$a_k = \begin{cases} 1 & \text{if } 10 \cdot \log_{10} \sum_{n=-N_{hist}}^{0} \frac{x_k^*(n) \cdot x_k(n)}{F^2} > L_{thres} \\ 0 & \text{otherwise} \end{cases}$$

with, for example, $L_{thres}=-30$ dB, for signals x with a full-scale amplitude F.

Alternatively, a speech detector can be applied on the signals.

Determining if two remote clients 103 are proximal is typically only evaluated when one of the users is active, and the last determined decision is kept when they are not active. This prevents toggling of the metadata depending on whether speakers are active.

Further means may be taken to ensure robustness of the decision. For example, a decision whether remote clients i and j are in the same room may only be changed when at least 15 seconds of active signal ($\alpha_i==1$ or $\alpha_j==1$) results in a different signal.

In some embodiments, the audio server 101 determines which remote clients are in the same room and sends the information as metadata to the remote clients 103. In particular, this embodiment is advantageous when the audio signals of users are not mixed in the audio server 101 for each client, but sent separately. For example, VR applications where each user's signal is rendered to a specific location in the virtual (or augmented) reality. In this case the remote clients can use the metadata of which other users are e.g. in the same room to decide not to render or play the corresponding signals received from the conferencing server.

Figure 6:
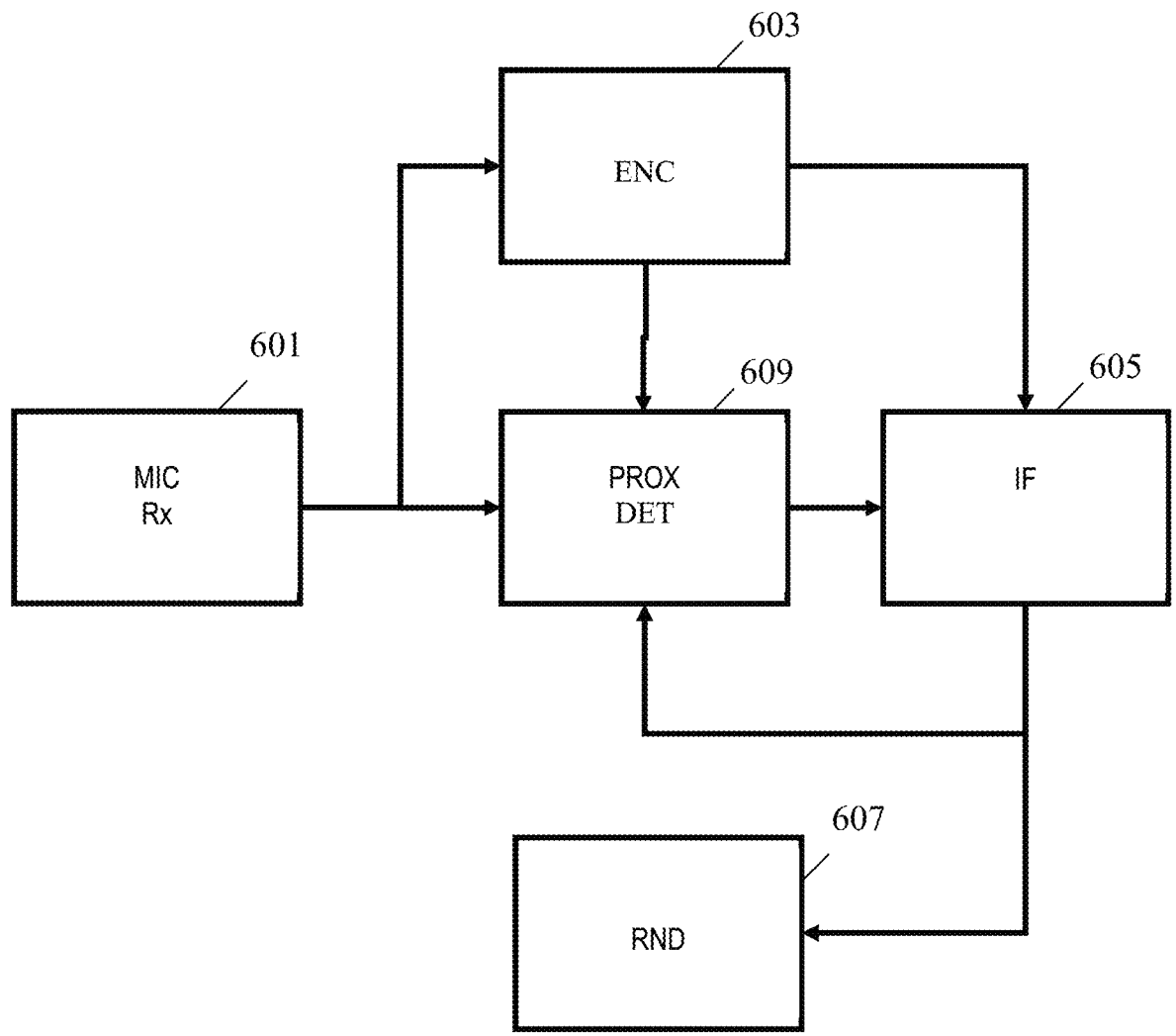
FIG. 6 illustrates an example of elements of a remote client for an audio distribution system in accordance with some embodiments of the invention.

In some embodiments, the proximity detector may, as mentioned, be located in the remote client. An example of elements of such a remote client is illustrated in FIG. 6.

The remote client comprises an input 601 coupled to a microphone and arranged to generate a microphone signal corresponding to audio captured by the microphone. The microphone signal is fed to an encoder 603 which encodes the signal to generate the audio component (in some embodiments, the microphone signal may be used directly as the audio component).

The encoder is coupled to an interface 605 which is arranged to communicate with the audio server 101. The interface thus comprises a transmitter for transmitting data to the audio server 101 and a receiver for receiving data from the audio server 101. The interface 605 is fed the audio component data and transmits this to the audio server 101.

In addition, the interface 605 receives audio components and proximity data from other remote clients, and specifically the interface 605 may comprise the receiver 401 of FIG. 4.

The remote client further comprises an audio renderer 607 which may correspond directly to the generator 403 of FIG. 4. The generator 403 may as previously described proceed to generate a local mix for presentation to the local user.

In other embodiments, the audio received from the audio server 101 may be a downmixed signal, i.e. the generator 409 may be comprised in the audio server 101 and the audio transmitted may e.g. be a binaural stereo signal or a surround sound signal. The renderer 607 may in such embodiments directly render the received signal.

The remote client of FIG. 6 further comprises a proximity detector 607 which is arranged to determine a proximity indication for the first remote client in response to a comparison of the microphone signal (possibly as represented by the audio component) and audio received from the audio server.

For example, if the received audio corresponds to audio components from other remote clients, these may directly be fed to the proximity detector 609 which may then proceed to correlate the microphone signal (possibly as represented by the audio component) with the received audio components and generate a proximity indication for each of the received audio components. The proximity indications may be fed to the interface 605 which may transmit proximity data comprising the proximity indications to the audio server 101.

In the case where the received audio corresponds to an audio mix comprising a plurality of audio components of other remote clients combined/mixed into the same audio signal(s)/channel(s), the proximity detector 609 may correlate the microphone signal with the audio mix.

For example, if the audio mix comprises only a single signal, the proximity detector 609 may correlate the received signal with the microphone signal and if a correlation above a given level is detected, a proximity indication may be generated to indicate that the currently active remote client (for the currently active speaker) is proximal to the current remote client.

If the audio mix comprises more than one channel/signals, these may e.g. be combined prior to correlation, or correlations may be made for each channel signal, and e.g. only the largest correlation may be considered.

If cases where the identity of the currently active remote client/speaker is known by the remote client (e.g. such activity may be detected by the audio server 101 and corresponding information may be forwarded to the remote client), the remote client may generate a proximity indication which includes this identification of the other remote client as being proximal.

In cases where such information may not be available, the remote client may simply transmit a proximity indication indicating that the currently active speaker/remote client is proximal. In such a case, the audio server 101 may for example be arranged to detect the currently active speaker (e.g. using speech detection) and may determine the appropriate identity of the remote client which is proximal to the remote client transmitting the proximity indication as the identified currently active speaker/remote client.

Thus, in some embodiments, remote clients may detect proximal remote clients comparing the signal(s) received from the audio server 101 to its local microphone signal (e.g. after acoustic echo cancelation (AEC)).

For example, the client can determine the cross-correlation between the signals received from the server and the remote client's microphone signal:

$$\rho_i = \max \left\{ \max_{0 \leq \delta \leq \delta_{max}} \frac{\left\| \sum_{n=-(N_{hist}-\delta_{max})}^{0} y_i^*(n-\delta) \cdot x(n) \right\|}{\sqrt{\sum_{n=-(N_{hist}-\delta_{max})}^{0} y_i^*(n-\delta) \cdot y_i(n-\delta) \cdot \sum_{n=-(N_{hist}-\delta_{max})}^{0} x^*(n) \cdot x(n)}}, \right.$$

$$\left. \max_{-\delta_{max} \leq \delta < 0} \frac{\left\| \sum_{n=-(N_{hist}-\delta_{max})}^{0} y^*(n) \cdot x_i(n+\delta) \right\|}{\sqrt{\sum_{n=-(N_{hist}-\delta_{max})}^{0} y^*(n) \cdot y(n) \cdot \sum_{n=-(N_{hist}-\delta_{max})}^{0} x_i^*(n+\delta) \cdot x_i(n+\delta)}} \right\}$$

where $y_i$ denotes a signal received from the audio server, x the local microphone signal, $\|x\|=\sqrt{x^* \cdot x}$ the norm, n the sample index to the (history of the) microphone signals with n=0 denoting the latest available sample, $N_{hist}$ the number of past samples used in the analysis and $\delta_{max}$ the maximum supported delay between microphone signals.

For example, $\delta_{max}=\lfloor 2 \cdot f_s \rfloor$ and $N_{hist}=\lfloor 20 \cdot f_s \rfloor$ with $f_s$ the sample rate of the microphone signals and $\lfloor \cdot \rfloor$ the rounding down operation. Particularly, for this approach, the value of $\delta_{max}$ must be large enough to account for delays between microphone signal and the signals received from the audio server due to system delays in the (distributed) system due to, for example, encoding, transmission (from client to server), processing in the server, transmission (from server to client), and decoding and due to different acoustic path lengths between the users and the microphones (in the same room).

If for a certain i the above cross-correlation is high, for example $\delta_i \geq 0.2$, user i can be considered to be in the same room (proximal).

Alternatively, the client may use the microphone signal before AEC is applied to it. It may focus on delays larger than, for example, 15 ms to separate the acoustic feedback between the speaker and the microphone in the client from the larger conferencing system delay. The client may also look for both correlation peaks and provide the shorter delay to the AEC.

If one or more clients send more than one audio component, the algorithm may e.g. select the loudest microphone signal for analysis, calculate a downmix of all the microphone signals or choose a specific microphone signal.

Similarly, as in the server-side approach, the correlation will typically only be calculated when a user is speaking, and more specifically, when an active speaker is present in one of the signals received from the server.

The audio components/signals $y_i$ received from the audio server 101 may typically represent (at least partially) other users in the conference call. This allows the remote client to determine which users are in the same room based on which signals have high correlations. Some users' signals may not be transmitted due to them being muted or determined to be inactive by the audio server.

As mentioned, in some signals the audio components may be combined into an audio mix in the audio server 101. When signals $y_i$ represent such an audio mix, they may represent audio channels and some users' signals may be present in multiple audio channels. Analyzing audio channels individually may therefore not always result in particularly useful extra information. Therefore, it may be advantageous to downmix the signals, and determine correlation of the result with the local microphone signal. The downmix may be calculated by:

$$y = \frac{1}{\# I_m} \sum_{c \in I_m} y_c$$

where $I_m$ is the set of indices of input signals related to a set of audio signals and $\# I_m$ is the cardinality of set $I_m$.

A result of this approach is a lower computational complexity, which is advantageous for reducing CPU usage in general and/or improving battery-life in portable devices.

Such an approach is particularly advantageous when the signals of all clients are (at least partially) pre-mixed or pre-rendered in the server, however it may also be applied for signals that are not pre-mixed or pre-rendered.

In some cases when an audio mix is received, it may not be possible to determine directly which users are in the same room, as it may not be possible to differentiate directly between the audio components of different remote clients when embedded in the same audio mix. However, the client can send metadata indicating that the currently active user is (likely to be) in the same room. The audio server 101 may take this into account e.g. by not pre-mixing or pre-rendering the active user's signal in the signal that it sends to the client that sent the metadata, and vice versa.

Some conferencing applications send information of the participants in the call. In such cases, this can be used to determine which user is active on the client side when a high cross-correlation is detected, and the remote client can send that information to the server.

The server may post-process the metadata it receives to improve robustness. For example, multiple users may be indicated to be simultaneously active while a third client sends metadata indicating that the currently active user is in the same room. The audio server may then combine this with information from these other two users, where one may also indicate that the currently active user is in the same room. Then this may mean that all three are in the same room. Alternatively, it may flag the loudest of the active users as in the same room, or increase a likelihood value for both of the active users. When the likelihood value is larger than a certain threshold value, the corresponding user may be considered to be in the same room. Alternatively, it may reduce the users' level in the pre-mix in relation to the increasing likelihood value.

Different methods described above can be combined for clients where both pre-mixed signals and individual signals are received, and/or when the signal properties change over time (e.g. due to changing bandwidth availability).

Similarly, as for the server-side approach, robustness can be improved within the clients using the same or similar methods.

In embodiments where cross-correlation between signals is performed, it may be performed on the fully time domain signals as described above. Alternatively, in some embodiments, the correlation may be performed on a time-frequency representation (for example after QMF filterbank (Quadrature Mirror Filter), STFT (short-term Fourier transform) or windowed MDCT or FFT analysis). In those cases, each sum in the correlation equations above become a two dimensional summation over time slots or frames in the temporal dimension (n) and frequency bands or bins in the spectral dimension (b).

$$\sum_{b=0}^{B} \sum_{n=-(\hat{N}_{hist}-\hat{\delta}_{max})}^{0} f(n, b)$$

where f(n,b) represents the corresponding function of x and/or y in the correlation equation, with x and y taking n as time-domain index and b as frequency domain index. $\hat{N}_{hist}$ and $\hat{\delta}_{max}$ are $N_{hist}$ respectively $\delta_{max}$ in terms of time-slots or frames. For example $$\hat{N}_{hist} = \frac{N_{hist}}{64} \left\lceil \frac{N_{hist}}{64} \right\rceil$$

for a QMF filterbank with a downsampling factor of 64, or $$\hat{\delta}_{max} = \frac{\delta_{max}}{256} \left\lceil \frac{\delta_{max}}{256} \right\rceil$$

for a windowed FFT with a hop-size of 256 samples with $\lceil \cdot \rceil$ the rounding up operation.

As another example, in some embodiments, the cross-correlation may be applied on the envelope, energy profile or frequency-dependent energy profile of the signals. This is advantageous for achieving a lower computational complexity and may be advantageous in cases where the signals $y_i$ are parametrically reconstructed from a lower number of downmix signals and therefore more likely to have high correlation in the local fine-structure of the reconstructed signals. Alternatively, in the latter case, the correlation could also be applied to the reconstruction parameters.

In the case of frequency dependent correlation calculations, some embodiments may apply a weighing to certain frequency bins/bands in order to emphasize typical speech frequencies.

A (frequency dependent) energy profile could be calculated from the signals as follows:

$$\hat{x}(\hat{n}, \hat{b}) = \sum_{b=\hat{b}_{start}}^{\hat{b}_{end}} \sum_{n=\hat{n}_{start}}^{\hat{n}_{end}} x^2(n, b)$$

where each new time-frequency representation of energy-profile $\hat{x}$ is the total energy of all time-frequency tiles in the signal representation x(n,b). The start and stop bins for bin $\hat{b}$ are indicated by $\hat{b}_{start}$ and $\hat{b}_{end}$ respectively, and start and stop time slots are indicated by $\hat{n}_{start}$ and $\hat{n}_{end}$ respectively. In case of purely time-domain signals (e.g. PCM signal) the b index and summation can be omitted.

In some embodiments, other approaches for determining proximity between remote clients 103 may alternatively or additionally be used.

For example, in some embodiments, the proximity indications may be determined by direct manual configuration, for example using a user interface of the individual remote clients. Other embodiments may use localization technology such as GPS, indoor localization technologies, IP addresses or by means of network IDs etc. In some embodiments, the remote clients 103 may send such data to the server and this may then evaluate the received data to determine which remote clients 103 are close to each other.

For example, IP/MAC addresses and/or network delay times may be used as an indication of remote clients being proximal. E.g. the fact that remote clients 103 share network equipment is indicative of colocation.

In some embodiments, the proximity of two remote clients may be detected by detecting an acoustic feedback in which case the system may proceed to prevent such acoustic feedback (e.g. by changing the loop characteristics so positive feedback is prevented).

An example of a test process that may be used to detect proximity by detecting acoustic feedback may start with all microphones muted (or with audio components not being fed back to the clients) to guarantee that there is currently no acoustic feedback. Microphones from different pairs of remote clients may then be switched on and if this results in an acoustic feedback, then the corresponding pair of remote clients are considered to be proximal. This approach may interrupt the conference call for some time in order to allow detection of acoustic feedback in each pair of clients.

Detection of acoustic feedback can be done in various ways. One low complexity approach would be to determine whether the levels of multiple clients are increasing, or whether one or more client microphones provide an exponentially increasing level. Taking into account the average round-trip delay in the system, this may show the exponential increase of RMS level to be step-wise with a periodicity similar to the round-trip delay. A spectral flatness measure (SFM) may also used for detection of acoustic feedback is described in Devis Thomas, A. R. Jayan, Automated Suppression of Howling Noise Using Sinusoidal Model based Analysis/Synthesis, IEEE International Advance Computing Conference (IACC), ITM University, Gurgaon, India, pp. 761-765, 2014. Other approaches may determine similarities in multiple microphone signals from different clients, such as high correlations between spectra or spectrograms. Another example would be to determine the presence of clipping in microphone signals.

Another example of an approach for detecting which clients are e.g. in the same location, is by adding a marker signal or watermark in each client's audio component. This marker may be chosen so that it is generally not perceivable by humans, and may be designed such that it can be detected in a microphone signal despite the distortions imposed by the used codec and acoustic path.

For example, the server may insert these markers into the audio transmitted to the clients. It is often beneficial if each client gets a unique marker. Subsequently, in some embodiments, the server may analyze received clients' microphone signals for markers of other clients. In other embodiments the clients may analyze their own microphone signals and transmit marker information to the server. This marker information may be a detected marker ID, or it may have mapped the detected marker ID to a corresponding client in response to mapping metadata it received from the server.

In the described examples above, the generation of an audio mix is dependent on the proximity data. However, it will be appreciated that such data may also be used for other purposes.

For example, in some embodiments, the proximity data may be used to (e.g. spatially) group the users according how they are grouped physically. In some embodiments, for example AR, the proximity data may be used to determine which users are not physically present in the room and if so a virtual avatar for the user may be presented. In some embodiments the proximity data may (additionally) be used to render the signals of users not in the physical room at locations that are not overlapping with users that are.

In some embodiments the metadata and/or client-side analysis may be used to synchronize playback on the different devices, such that play back with small mutual delays is achieved.

In some embodiments the proximity data may be used to not render the signals received from the server related to the users in the same room, but to alternatively use the local microphone capture of those users for rendering. This may be advantageous when users are wearing headphones that may block or attenuate the acoustic paths. By keeping the processing local, the conferencing system delay may be eliminated resulting in better lip-sync.

In some embodiments, a first remote client may transmit a generated microphone signal or audio component to a second remote client detected to be colocated. The transmission may be via a direct data link (LAN/optical/RF), and may specifically exclude the audio server 101. This may provide a link/communication with reduced transmission delay. The second remote client may then use this directly received signal to attenuate or suppress the signal from the audio source of the first remote client. Such an approach may be an alternative to using the acoustic path and benefits from a faster transmission (due to the difference in speed of light and sound. It may avoid unnecessarily complex or error prone audio processing by having a clean audio "reference" available in time at the second remote client.

In some embodiments such a link may be used to synchronize the playback of the audio mix between the remote clients that are in the same room. Alternatively, such synchronization metadata runs through the audio server. The synchronization will in most embodiments take into account the colocated client with the highest latency with respect to the data received from the server and delay the playback of the audio mix in the other colocated clients to synchronize. This continuous synchronization process is known in the art and can be achieved using time synchronization protocols such as NTP (Network Time Protocol) or PTP (Precision Time Protocol).

As previously mentioned, the acoustic proximity may be different in a direction from a first remote client to a second remote client than from the second remote client to the first remote client reflecting that the acoustic transfer function may be different in the two directions. Accordingly, in many embodiments, the proximity data may comprise different proximity indications for a pair of remote clients 103 depending on the direction.

For example, the proximity data provided by the audio server 101 to a remote client may include two values for a given other remote client and the local audio mixing may accordingly be in response to the proximity indication from the other remote client to this one.

The use of asymmetric/directional proximity indications may provide improved performance in many embodiments including in particular situations where for example one user wears headphones whereas the other uses a loudspeaker rendering.

In some embodiments, the proximity data may be communicated/distributed at the initialization of a service/application and this proximity data may be used until the end of this. For example, when a new conference session is initialized, proximity data may be exchanged and used until the end of the session.

However, in most practical embodiments, the system may be arranged to dynamically determine/adapt/update/distribute at least some proximity data. Thus, the receiver 401 is typically arranged to receive proximity data dynamically adapting to changes in positions of the remote clients.

Specifically, the proximity detector(s) of the audio server 101 and/or the remote clients 103 may continuously correlate the appropriate signals and determine proximity indications based on the correlation results. The system may then continuously distribute proximity indications for example by continuously transmitting metadata comprising proximity indications with the distribution of the audio components.

In many embodiments, the system may be arranged to transmit proximity indications for (at least) a first remote client pair with an update rate of no more than a minute and often no more than 30 seconds.

Such dynamic updates may provide an efficient and adaptive system that may adapt to the changes in user positions. For example, it may in many embodiments adapt quickly to a conference participant with a connection over his/her phone walking into a meeting room where another client is. For example, it may often prevent that acoustic feedback occurs when the participant walks into the meeting room.

It will be appreciated that the proximity data may be transmitted as metadata in many different ways and that the specific approach used may depend on the preferences and requirements of the individual embodiment.

The exact structure, syntax and content of the metadata will depend on the specific embodiment. Thus, the metadata can be configured and transmitted in various ways and the preferred approach may also depend on whether client-side detection or server-side detection is used, (or a combination).

In the case of server side detection, the metadata is typically sent from the server to one or more clients. The metadata may contain information of which users/clients are in the same location. For example, an indication of indices or names of clients, or a bitmap may be used. Part of the syntax of the bit streams sent by the server to clients could for example be as follows:

| Syntax | Nr of bits |
|---|---|
| locSharing(usersSharingLoc[ ][ ], nrLocs, nrUsers, userNames[ ], preferredMethod) | |
| { | |
| preferredMethod; | 2 |
| nrLocs; | 7 |
| if (preferredMethod == LS_METH_INDICES | |
|   \|\| preferredMethod == LS_METH_NAMES) | |
| { | |
|   for (loc = 0:nrLocs − 1) | |
|   { | |
|     for (uIdx = 0:nrUsers − 1) | |
|     { | |
|       if (usersSharingLoc[loc][uIdx] == 1) | |
|       { | |
|         if (preferredMethod == LS_METH_NAMES) | |
|         { | |
|           userNames[uIdx]; | variable |
|           (0); | 1 |
|         } | |
|         else | |
|         { | |
|           uIdx; | 7 |
|         } | |
|       } | |
|     } | |
|     (128); | 8 |
|   } | |
| } | |
| else if (preferredMethod == LS_METH_BITMAP)) | |
| { | |
|   nrUsers; | 7 |
|   for (loc = 0:nrLocs − 1) | |
|   { | |
|     for (uIdx = 0:nrUsers − 1) | |
|     { | |
|       usersSharingLoc[loc][uIdx]; | 1 |
|     } | |
|   } | |
| } | |
| } | |

This example shows a syntax that supports three different methods for sending the metadata to the clients, and chooses one depending on a preferred setting. It provides all clients with information on how many unique locations (alternatively how many locations with more than 1 user) there are, and which users are present in which location.

As another example, the relevant metadata may only be sent to users sharing a location. This is shown in the syntax example below:

| Syntax | Nr of bits |
|---|---|
| locSharingLimited(usersSharingLoc[ ][ ], nrLocs, nrUsers, userNames[ ], curUserLocIdx, preferredMethod) | |
| { | |
| preferredMethod; | 2 |
| if (preferredMethod == LS_METH_INDICES | |
|   \|\| preferredMethod == LS_METH_NAMES) | |
| { | |
|   for (uIdx = 0:nrUsers − 1) | |
|   { | |
|     if (usersSharingLoc[curUserLocIdx][uIdx] == 1) | |
|     { | |
|       if (preferredMethod == LS_METH_NAMES) | |
|       { | |
|         userNames[uIdx]; | variable |
|         (0); | 1 |
|       } | |
|       else | |
|       { | |
|         uIdx; | 7 |
|       } | |
|     } | |
|   } | |
|   (128); | 8 |
| } | |
| else if (preferredMethod == LS_METH_BITMAP)) | |
| { | |
|   nrUsers; | 7 |
|   for (loc = 0:nrLocs − 1) | |
|   { | |
|     for (uIdx = 0:nrUsers − 1) | |
|     { | |
|       usersSharingLoc[curUserLocIdx][uIdx]; | 1 |
|     } | |
|   } | |
| } | |
| } | |

In the case of client-side detection, the metadata is typically sent to the server and the server may typically send metadata with similar or derived information to one or more clients.

The client, for example, may send a flag that indicates whether at that point in time, a high correlation is detected between the output signal and the microphone signal (after AEC). Additionally or alternatively, it may send an indication of the maximum correlation value.

In other embodiments the client may additionally use metadata indicating which users are active and may transmit data indicating one or more specific users that are determined to be in the same location. This may be done using similar syntax as those described above.

Additionally the client may send metadata describing with which method it was detected, and/or what the delay is between the direct acoustic capture and the high correlation in the audio signal received from the conferencing server.

An example syntax of data sent from client to server is as follows:

| Syntax | Nr of bits |
|---|---|
| locSharingClientAssessment( ) { | |
| currentActiveSpeakerInSameLoc; | 1 |
| if (furtherLocSharingData) | 1 |
| { | |
| detectionMethod; | 3 |
| maxCrossCorr; | 6 |
| } | |
| } | |

An example definition of detection method metadata may be as follows:

| detectionMethod | Description |
|---|---|
| 0 | PCM signal correlation |
| 1 | Temporal energy profile correlation |
| 2 | Frequency-dependent energy profile correlation |
| 3 | Weighted frequency-dependent energy profile correlation |
| 4 | Indoor localization |
| 5 | Manual configuration |
| 6 | <Reserved> |
| 7 | <Reserved> |

In response to similar metadata from one or more clients, the server may send metadata similar to that described above. The server may pool the information received from multiple clients. To that end, it may combine all location sharing indications. If, for example, clients A and B indicate they are in the same location as user D and client D indicates a shared location with users A and C, the server may indicate that users A, B, C and D are in the same location.

Alternatively it may indicate that users A and D are in the same location, because they mutually indicated a shared location.

It will be appreciated that the above description for clarity has described embodiments of the invention with reference to different functional circuits, units and processors. However, it will be apparent that any suitable distribution of functionality between different functional circuits, units or processors may be used without detracting from the invention. For example, functionality illustrated to be performed by separate processors or controllers may be performed by the same processor or controllers. Hence, references to specific functional units or circuits are only to be seen as references to suitable means for providing the described functionality rather than indicative of a strict logical or physical structure or organization.

The invention can be implemented in any suitable form including hardware, software, firmware or any combination of these. The invention may optionally be implemented at least partly as computer software running on one or more data processors and/or digital signal processors. The elements and components of an embodiment of the invention may be physically, functionally and logically implemented in any suitable way. Indeed, the functionality may be implemented in a single unit, in a plurality of units or as part of other functional units. As such, the invention may be implemented in a single unit or may be physically and functionally distributed between different units, circuits and processors.

Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term comprising does not exclude the presence of other elements or steps.

Furthermore, although individually listed, a plurality of means, elements, circuits or method steps may be implemented by e.g. a single circuit, unit or processor. Additionally, although individual features may be included in different claims, these may possibly be advantageously combined, and the inclusion in different claims does not imply that a combination of features is not feasible and/or advantageous. Also the inclusion of a feature in one category of claims does not imply a limitation to this category but rather indicates that the feature is equally applicable to other claim categories as appropriate. Furthermore, the order of features in the claims do not imply any specific order in which the features must be worked and in particular the order of individual steps in a method claim does not imply that the steps must be performed in this order. Rather, the steps may be performed in any suitable order. In addition, singular references do not exclude a plurality. Thus references to "a", "an", "first", "second" etc. do not preclude a plurality. Reference signs in the claims are provided merely as a clarifying example shall not be construed as limiting the scope of the claims in any way.

The invention claimed is:

1. An audio apparatus for an audio distribution system, wherein the audio apparatus comprises:
   a receiver circuit,
      wherein the receiver circuit is arranged to receive data,
      wherein the data comprises audio data and proximity data,
      wherein the audio data comprises a plurality of audio components,
      wherein each audio component of the plurality of audio components represents audio from a first remote client of a plurality of remote clients,
      wherein the proximity data is for at least one of the plurality of audio components,
      wherein the proximity data is indicative of a physical proximity between remote clients; and
   a generator circuit,
      wherein the generator circuit is arranged to generate an audio mix of the plurality of audio components in response to the proximity data, wherein the audio distribution system comprises an audio server, wherein the audio server is arranged to receive incoming audio from the plurality of remote clients, wherein the audio server is arranged to transmit a portion of audio derived from the incoming audio to at least a portion of the plurality of remote clients, wherein the proximity data is indicative of at least one currently active remote client, wherein the at least one currently active remote client is determined to be proximate in response to a correlation greater than a threshold between a microphone signal and a portion of the incoming audio, wherein the microphone signal corresponds to audio captured by a plurality of microphones.

2. The audio apparatus of claim 1, wherein the generator circuit is arranged to generate a first audio mix for the first remote client of the plurality of remote clients, wherein the generation of the first audio mix comprises determining an attenuation in the first audio mix of a second audio component for a second remote client in response to the proximity data.

3. The audio apparatus of claim 2, wherein the generator circuit is arranged to attenuate the second audio component in the first audio mix in response to the proximity data, wherein the proximity data meets a proximity criterion for the first remote client and the second remote client.

4. The audio apparatus of claim 1, wherein the audio apparatus is part of the audio server.

5. The audio apparatus of claim 1, wherein the audio apparatus is part of the first remote client of the plurality of remote clients.

6. The audio apparatus of claim 1, wherein the proximity data comprises a proximity indication, wherein the proximity indication is for at least the first remote client and a second remote client, wherein the proximity indication is indicative of an acoustic attenuation from an audio source of the second remote client to a capture element of the first remote client.

7. The audio apparatus of claim 1, wherein the proximity data comprises at least a first proximity indication and a second proximity indication, wherein the first proximity indication is from the first remote client to a second remote client, wherein the second proximity indication is from the second remote client to the first remote client, wherein the first proximity indication is different from the second proximity indication.

8. The audio apparatus of claim 1, wherein the proximity data dynamically adapts to changes in positions of at least one of the plurality of remote clients.

9. An audio distribution system, comprising
a plurality of remote clients; and
an audio server, wherein the audio server is arranged to receive incoming audio from the plurality of remote clients, wherein the audio server is arranged to transmit a portion of audio derived from the incoming audio to at least a portion of the plurality of remote clients, wherein at least one of the audio server and a portion of the plurality of remote clients comprises a receiver circuit and a generator circuit, wherein the receiver circuit is arranged for receiving data, wherein the data comprises audio data and proximity data, wherein the audio data comprises a plurality of audio components, wherein each audio component of the plurality of audio components represents audio from a first remote client of a plurality of remote clients, wherein the proximity data for at least one of the audio components, wherein the proximity data is indicative of a physical proximity between remote clients, wherein the generator circuit is arranged to generate an audio mix of the plurality of audio components in response to the proximity data, wherein the first remote client of the plurality of remote clients comprises:
an input circuit,
wherein the input circuit is arranged to generate a microphone signal,
wherein the microphone signal corresponds to audio captured by a plurality of microphones;
a proximity detector circuit,
wherein the proximity detector circuit is arranged to determine a proximity indication,
wherein the proximity indication is for the first remote client and the audio server in response to a comparison of the microphone signal and a portion of incoming audio; and
a transmitter circuit,
wherein the transmitter circuit is arranged to transmit acoustic audio data,
wherein the acoustic audio data comprises the proximity indication for the first remote client and the audio server,
wherein the transmitter circuit is arranged to transmit proximity data, wherein the proximity data is indicative of at least one currently active remote client, wherein the at least one currently active remote client is determined to be proximate in response to the first proximity detector circuit detecting a correlation greater than a threshold between the microphone signal and the portion of the incoming audio.

10. The audio distribution system of claim 9, wherein the audio distribution system further comprises a proximity detector circuit and a transmitter circuit, wherein the proximity detector circuit is arranged to determine a proximity indication, wherein the proximity indication is for the first remote client and a second remote client in response to a comparison of a first audio component and a second audio component wherein the first audio component is for the first remote client, wherein the second audio component is for a second remote client, wherein the transmitter circuit is arranged to transmit the proximity data, wherein the proximity data comprises a proximity indication to the receiver.

11. The audio distribution system of claim 10, wherein the proximity detector circuit is part of the audio server.

12. A method of operation of an audio apparatus for an audio distribution system, wherein the audio distribution system comprises an audio server, wherein the audio server is arranged to receive incoming audio from a plurality of remote clients, wherein the audio server is arranged to transmit a portion of audio derived from the incoming audio to at least some of the plurality of remote clients, the method comprising:
- receiving data,
  - wherein the data comprises audio data and proximity data,
  - wherein the audio data comprises a plurality of audio components,
  - wherein each audio component of the plurality of audio components represents audio from a first remote client of a plurality of remote clients,
  - wherein the proximity data is for at least one of the audio components,
  - wherein the proximity data is indicative of a physical proximity between remote clients; and
- generating an audio mix of the plurality of audio components in response to the proximity data,
  - wherein the proximity data is indicative of at least one currently active remote client,
  - wherein the at least one currently active remote client is determined to be proximate in response to a correlation greater than a threshold between a microphone signal and a portion of the incoming audio from the audio server,
- wherein the microphone signal corresponds to audio captured by a plurality of microphones.

13. A computer program stored on a non-transitory medium, wherein the computer program when executed on a processor performs the method as claimed in claim 12.

14. The method claim 12, further comprising generating a first audio mix for the first remote client of the plurality of remote clients, wherein the generation of the first audio mix comprises determining an attenuation in the first audio mix of a second audio component for a second remote client in response to the proximity data.

15. The method claim 14, further comprising attenuating the second audio component in the first audio mix in response to for the proximity data meeting a proximity criterion for the first remote client and the second remote client.

16. The method of claim 12, wherein the audio apparatus is part of the audio server.

17. The method of claim 12, wherein the audio apparatus is part of the first remote client of the plurality of remote clients.

18. The method of claim 12,
- wherein the proximity data comprises a proximity indication for at least the first remote client and a second remote client,
- wherein the proximity indication is indicative of an acoustic attenuation from an audio source of the second remote client to a capture element of the first remote client.

* * * * *